(12) United States Patent
Akashi et al.

(10) Patent No.: US 7,595,495 B2
(45) Date of Patent: Sep. 29, 2009

(54) MICROREACTOR DEVICE AND MICROCHANNEL CLEANING METHOD

(75) Inventors: Ryojiro Akashi, Kanagawa (JP);
Daisuke Nakayama, Kanagawa (JP);
Masaki Hirota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 379 days.

(21) Appl. No.: 11/598,798

(22) Filed: Nov. 14, 2006

(65) Prior Publication Data
US 2008/0073545 A1   Mar. 27, 2008

(30) Foreign Application Priority Data
May 30, 2006   (JP) .............................. 2006-149883

(51) Int. Cl.
*B01J 19/08* (2006.01)
*B01L 11/00* (2006.01)

(52) U.S. Cl. ........................ 250/438; 250/428; 210/205; 210/222; 210/223; 436/49; 436/501

(58) Field of Classification Search ........................ None
See application file for complete search history.

(56) References Cited

U.S. PATENT DOCUMENTS 2,430,157 A * 11/1947 Byrd, Jr. ..................... 210/222
2,490,635 A * 12/1949 Kisch .......................... 210/223
5,705,062 A *  1/1998 Knobel ........................ 210/205
5,928,804 A *  7/1999 Leddy et al. ................... 429/10
5,950,681 A *  9/1999 Reimelt ......................... 138/97
6,001,248 A * 12/1999 Leddy et al. ................. 210/222
6,303,242 B1* 10/2001 Leddy et al. ................... 429/10
6,412,643 B1*  7/2002 Wysolmierski ............. 209/213
6,537,817 B1*  3/2003 Papen ........................... 436/49
6,787,112 B1*  9/2004 Turner et al. ................ 422/130
7,138,254 B2* 11/2006 Jovanovich et al. ........ 435/91.2
7,183,104 B1*  2/2007 Megerle .................... 435/309.1
7,244,961 B2*  7/2007 Jovanovich et al. ........... 257/48
2003/0134316 A1*  7/2003 Tashiro et al. .................. 435/6
2008/0031787 A1*  2/2008 Yu .............................. 422/188
2008/0160630 A1*  7/2008 Liu et al. ...................... 436/164
2008/0160634 A1*  7/2008 Su et al. ....................... 436/501
2008/0160639 A1*  7/2008 Su et al. ....................... 436/526

FOREIGN PATENT DOCUMENTS

JP   2005-130726 A   5/2005
JP   2005-227250 A   8/2005

* cited by examiner

*Primary Examiner*—David A Vanore
(74) *Attorney, Agent, or Firm*—Oliff & Berridge, PLC

(57) ABSTRACT

A microreactor device includes: a microchannel; magnetic particles that are introduced into the microchannel; and a magnet that is arranged on an outside of the microchannel and exerts a magnetic force on the magnetic particles.

20 Claims, 1 Drawing Sheet

MICROREACTOR DEVICE AND MICROCHANNEL CLEANING METHOD

BACKGROUND

1. Technical Field

The present invention relates to a microreactor device having magnetic particles and a microchannel cleaning method using the magnetic particles.

2. Related Art

The microreactor device that gets a target product by passing a plurality of fluids through the microchannel to react compounds contained in respective fluids with each other has been known. Also, the reaction can be induced by forming various functional groups or catalysts on the inner wall of the microchannel or the target reaction can be induced by filling the particles that bear the catalysts in the channel.

After the reaction was induced by forming the catalysts or functional groups on the inner wall of the channel, the microreactor device in which the particular catalysts or functional groups were formed could not be reused in other applications. Thus, such a problem existed that a cost is increased. That is, it was difficult to exchange the catalysts fixed to the inner wall with that prepared for other purposes. In addition, it was difficult to update or exchange only the catalysts when a catalytic activity is deteriorated, or the like. Further, in order to form plural types of catalysts or functional groups on the inner wall of the channel, the processing must be applied in manufacturing the channel. Thus, the high-precision processing is needed, and a cost is increased.

Also, it was difficult to rinse the inner wall when the inner wall of the channel was contaminated.

SUMMARY

According to a first aspect of the present invention, a microreactor device includes: a microchannel; magnetic particles that are introduced into the microchannel; and a magnet that is arranged on an outside of the microchannel and exerts a magnetic force on the magnetic particles.

BRIEF DESCRIPTION OF THE DRAWINGS

Exemplary embodiment of the present invention will be described in detail based on the following figures, wherein.

DETAILED DESCRIPTION

A microreactor device of the present invention includes a microchannel (in the present invention, the microchannel is also referred simply to as a "channel" hereinafter), magnetic particles introduced into the microchannel, and a magnet arranged on an outside of the microchannel to exert a magnetic force on the magnetic particles. In this case, in the present invention, the magnetic particles signify a magnetic material and/or a magnetic material containing composition. As the magnetic material containing composition, the polymer particle containing the magnetic material, the polymer gel particles, the inorganic particles such as a glass, and the like can be listed. Preferably the magnetic particles should be selected from a group consisting of the magnetic material, the polymer particles containing the magnetic material, the polymer gel particles containing the magnetic material, the inorganic particles such as glass, or the like containing the magnetic material, and their mixture.

In the microreactor device of the present invention, the magnetic particles can flow into the microchannel and also the magnetic particles can flow out from the microchannel. The magnetic particles can be easily stopped or positioned in the microchannel by a magnet arranged on the outside of the microchannel. Also, the magnetic particles can be taken out easily of the microchannel to the outside by removing the magnet or stopping an application of a magnetic force In this manner, the magnetic particles can be exchanged or can be added to the inside of the microchannel. In addition, the microreactor device can be reused for other purposes by exchanging the magnetic particles.

Figure 1:
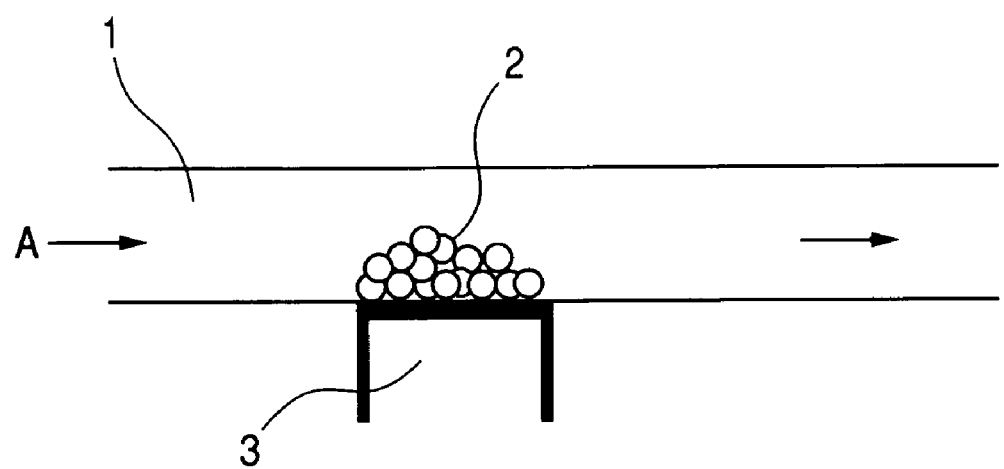
FIG. 1 is a conceptual sectional view showing an example of a microreactor device of the present invention.

FIG. 1 is a conceptual sectional view showing an example of the microreactor device of the present invention. A microreactor device 10 includes a microchannel 1, magnetic particles 2 introduced into the microchannel, and a magnet 3 arranged on the outside of the microchannel to exert a magnetic force on the magnetic particles 2. When a fluid A containing the magnetic particles 2 is fed, the magnetic particles 2 are arranged in a predetermined position in the microchannel 1 by the magnet 3.

In FIG. 1, the magnet 3 is arranged to contact the microchannel. But the magnet 3 may be arranged away from the microchannel within a range in which the magnet can exert a magnetic force on the magnetic particles in the microchannel.

The microreactor device of the present invention can arrange the magnetic particles in the microchannel without provision of a trapping portion in the microchannel. In case the trapping portion is provided in the microchannel to interrupt the magnetic particles and thus arrange the magnetic particles in the microchannel, a size of the particle must be set larger than an interval between the inner wall of the microchannel and the trapping portion so as to arrange the trapping portion effectively in the microchannel. Therefore, a specific surface area of the particle is reduced and an amount of catalysts and/or an amount of functional groups that can be borne on the surface of the particle. As a result, in some cases the reactivity is lowered. In particular, when an interval between the inner wall of the microchannel and the trapping portion is increased to enhance a flow rate, a size of the particle must be increased, so that it is difficult to make the reactivity consistent with the flow rate.

In the present invention, the small size magnetic particles can be arranged in the microchannel by the magnet, and also a high reactivity is compatible with a large flow rate.

In the present invention, it is preferable that the magnetic particles should have the catalysts and/or the functional groups. It is preferable that the catalysts and/or the functional groups can react with the compound contained in the fluid passing through the microchannel. Therefore, it is preferable that the surface of the magnetic particle should have the catalysts and/or the functional groups. Also, when the magnetic particles are constructed to contain the magnetic material in the polymer gel, it is preferable that such magnetic particles should have the catalysts and/or the functional groups in its inside.

The magnetic particles may have one type of catalysts and/or functional groups or plural types of catalysts and/or the functional groups.

Since the magnetic particles having the catalysts and/or the functional groups or the magnetic particles (e.g., magnetic material) having a catalytic action can be introduced into the microchannel and then fixed, a desired reaction unit can be introduced into the inside of the microchannel. Also, an amount of reaction unit can be controlled by an amount of magnetic particles arranged in the microchannel, a width of the magnetic, etc.

Also, it is preferable that the magnetic particles having plural different catalysts and/or functional groups should be arranged in different positions in the microchannel. Thus, the microreactor device capable of causing a multistage reaction in the microchannel can be easily obtained.

In addition, a length of the reaction unit and a distance between the reaction units can be controlled according to the purpose, and thus an effective reaction can be implemented.

One type of magnetic particles may be employed singly, or plural types of magnetic particles may be employed in combination For example, the magnetic particles containing different catalysts and/or functional groups can be employed. Also, the magnetic particles containing different types of magnetic materials may be employed, or the magnetic particles containing a different constituent component may be employed.

It is preferable that the magnetic particles should be arranged in a predetermined position by a magnetic force of the magnet arranged on the outside of the microchannel. According to the present invention, since the magnetic particles can be arranged by using a magnetic force of the magnet, the special processing is not required of the inner wall of the microchannel.

The magnetic particles may be arranged in plural positions by the magnet positioned on the outside of the microchannel. One type of magnetic particles may be arranged in plural positions in the microchannel. Also, plural types of magnetic particles may be arranged in different position in the microchannel every particle type.

Figure 2:
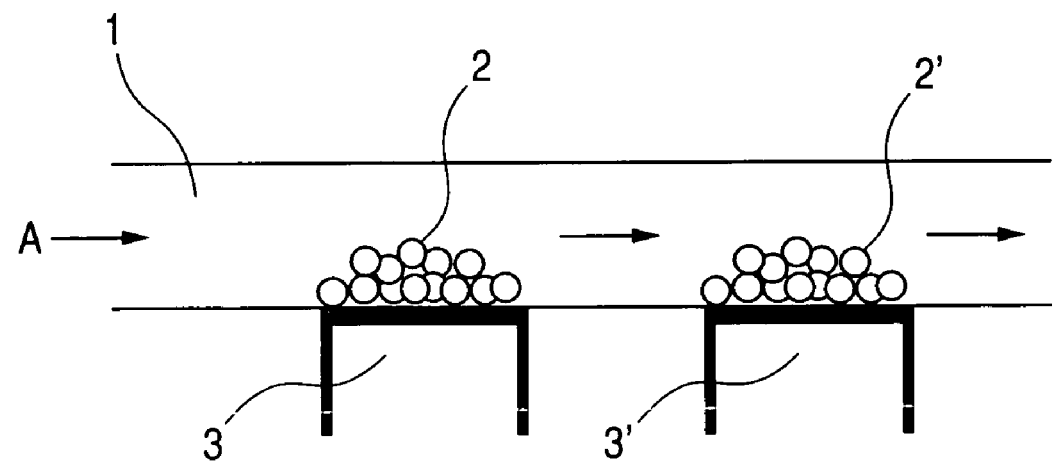
FIG. 2 is a conceptual sectional view showing another example of a microreactor device of the present invention.

FIG. 2 is a conceptual sectional view showing another example of a microreactor device of the present invention. The microreactor device 10 includes the microchannel 1, magnetic particles 2, 2', and the magnet 3 arranged on the outside of the microchannel to exert a magnetic force on the magnetic-particles 2 and a magnet 3' arranged on the outside of the microchannel to exert a magnetic force on the magnetic particles 2'. The magnetic particles are arranged at two locations in the microchannel. First, the fluid A containing the magnetic particles 2' is fed, and then the magnetic particles 2' are caught by the magnet 3'. Then, the fluid A containing the magnetic particles 2 is fed, and then the magnetic particles 2 are caught by the magnet 3, so that the microreactor device 10 in which plural types of magnetic particles are arranged in different positions respectively can be obtained. In FIG. 2, the magnets 3 and 3' are arranged to contact the microchannel. But the magnets 3 and 3' may be arranged away from the microchannel within a range in which the magnet can exert a magnetic force on the magnetic particles in the microchannel.

Also, it is preferable that magnetic material containing composition having different catalysts and/or functional groups should be employed and arranged in different positions every type of composition. Accordingly, a multistage reaction can be induced.

In addition, when the magnets arranged on the outside of the channel are removed in stages, the magnetic particles arranged in plural positions can be recovered individually.

Also, a flow of the fluid passing through the microchannel can be controlled by arranging the magnetic particles in a predetermined position in the microchannel. Concretely, the magnetic particles are arranged in a predetermined position by a magnetic force exerted from the magnet arranged on the outside of the microchannel to narrow the channel at the particle arranging portion or block the channel there or reduce a flow rate there, and thus a flow of the fluid can be controlled.

The microreactor device of the present invention containing the magnetic particles can control a flow of the fluid not to provide a valve, a baffle plate, or the like in the microchannel. Also, the microreactor device of the present invention can control a flow of the fluid in response to the purpose not to need the processing of the inside of the microchannel.

(Magnetic Particles)

In the present invention, the magnetic particles mean the magnetic material and/or the magnetic material containing composition, as described above. That is, the particles of the magnetic material can be employed as the magnetic particles or the composition containing the magnetic material (magnetic material containing composition) can be employed as the magnetic particles.

In the present invention, as the magnetic material used in the magnetic particles, the particles formed of magnetite, ferrite, iron, iron oxide, cobalt/iron oxide, SmCo magnet, neody iron boron, and the like can be given.

As the magnetic material containing composition, the polymer particles, the polymer gel particles, the inorganic particles made of glass, and the like containing the above magnetic material can be listed. It is preferable that the magnetic material containing composition should contain the ferromagnetic material or the permanent magnet among them as the magnetic material.

A shape of the magnetic particles can be selected variously according to the application or the required characteristic. A particle shape, a plate shape, a needle shape, an amorphous shape, a porous shape, and the like can be shown. The particle shape is preferable, and an elliptic shape or a spherical shape among the particle shape is more preferable. The elliptic shape or the spherical shape is preferable because the magnet can easily handle such shape.

Preferably a size (particle diameter) of the magnetic particle should be set in a range of 0.1 μm to 500 μm in terms of volumetric means, and more preferably the size should be set in a range of 1 μm to 100 μm. When the particle diameter is within the range, the magnetic material can be moved through the channel not to cause the clogging in the channel and also can have a magnetism that can be caught by the magnet on the outside of the microchanel. Here, the particle diameter means an average particle diameter by a volumetric standard. Also, in the needle-like particle, or the like having a minor axis and a major axis, an arithmetic means particle diameter or a geometric means particle diameter corresponds to the average particle diameter. In addition, the average particle diameter is measured by an optical approach such as a light scattering, or the like, a direct observation method, a sedimentation method, or the like.

In the magnetic material containing composition, the content of the magnetic material can be selected appropriately, and can be selected in a range in which the magnetism by which the magnetic material containing composition can be caught by a magnetic force of the magnet arranged on the outside of the microchanel can be maintained. In this case, preferably the content of the magnetic material should be set to 1 to 90 wt %, and more preferably the content of the magnetic material should be set to 3 to 60 wt %.

(Catalysts and Functional Groups)

As the catalysts, chemically reactive catalysts, biocatalysts, and the like can be utilized. As the chemically reactive catalysts, a metal, organic metal catalysts, and the like can be illustrated. Concretely, titanium, zirconium, chromium, molybdenum, iron, ruthenium, cobalt, rhodium, nickel, palladium, platinum, zeolite, organic metal catalysts containing them as a component, and the like can be listed.

As the biocatalysts, various enzymes, funguses, and the like can be used. Concretely, the enzymes such as amylase, protease, lipase, celllase, hemicellulase, pectinase, glucose oxidase, chymase, and the like can be listed. Also, various funguses such as yeast fungus, and the like can be listed.

The functional groups mean an atomic group or a bonding mode acting as a cause of reactivity, and a group rich in a reactivity in the molecule. The functional groups in various chemical reactivities indicating hydrogen bond, covalent bond, ionic bond, etc., the functional groups in the vital reaction such as antigen/antibody, DNA/RNA, and the like are selected variously in answer to the application. As the functional groups of the chemical reactivity, hydroxyl group, carbonyl group, carboxyl group, ethylene unsaturated double bond, triple bond, and the like can be listed.

In the present invention, a quantity of catalysts and/or functional groups that the magnetic material containing composition contains can be selected appropriately in answer to the purpose.

(Method of Manufacturing Magnetic Material Containing Composition)

It is preferable that various catalysts or functional groups are borne at least on the surface of the magnetic material containing composition. These may be dispersed in (kneaded into) the composition, or may be fixed onto the surface of the particle by various approaches.

Such manufacturing method will be exemplified hereunder. The composition in which metal, organic metal catalysts, etc. are contained in the magnetic material can be manufactured by mixing respective components and then solidifying them by means of the sintering, or the like. Also, the method of mixing respective components as fine grains and then caking them by means of a sol-gel glass, or the like can be applied. Also, it is desirable that the catalysts or the functional groups should be fixed onto the surface of the magnetic particle by the physical or chemical method.

The polymer containing the magnetic material can be manufactured by dispersing the magnetic material particles and the catalysts into the polymer or polymer gel matrix. Also, it is desirable that the catalysts or functional groups should be fixed on the surface or in the inside of the particle of the polymer or polymer gel containing the previously manufactured magnetic material by the physical or chemical method. In this case, the polymer or particle containing the magnetic material can be manufactured by the polymerization method, the atomizing polymerization method, the polymer atomization method, etc.

(Magnet)

As the magnet that is arranged on the outside of the microchannel to fix the magnetic particles in a predetermined position in the microchannel of the microreactor device by a magnetic force, a permanent magnet, an electromagnet, etc. can be listed. As the permanent magnet, the material systems similar to the foregoing magnetic particles can be listed. Preferably an alloy such as iron/cobalt, or the like, iron oxide (ferrite), SmCo magnet, neody iron boron, or the like should be employed. Also, as the electromagnet, the publicly known electromagnet in which a metal such as iron, or the like is combined with a coil can be employed.

In order to provide the magnetic particles in the microchannel at a desired amount or width (length), necessary sizes and numbers of the magnets can be selected variously and employed.

Also, in the present invention, plural electromagnets may be placed in the same portion and each electromagnet has a ring shape to surround circumferentially the outside of the channel. It is preferable that such constitution of the electromagnet can increase amount of retention and improve reaction efficiency by such constitution of the electromagnets.

Furthermore, in the case where the magnet constructed by winding a coil on a ring-like metal is used as the electromagnet, a magnetic force can be generated to surround circumferentially the outside of the channel when the microchannel is placed in this ring. The magnetic particles can be arranged on the substantially overall inner peripheral surface of the microchannel in a particular range by such arrangement of the electromagnet. Such arrangement is preferable from an aspect of the reaction efficiency.

(Microchannel)

In the present invention, preferably a width of the microchannel should be set to several to several thousands μm, and more preferably the width should be set to 10 to 1,000 μm.

In the present invention, since the microchannel of the microreactor device is in a micro scale, both a dimension and a flow rate are small and the Reynolds number is 2,300 or less. Therefore, unlike the ordinary reaction device in which the turbulent flow is dominant, the reaction device having the microchannel in a micro scale that the device in which the laminar flow is dominant.

In the present invention, when the magnetic particles are arranged in the microchannel by the magnet arranged on the outside of the microchannel, the turbulent flow can also be generated. Accordingly, the fluid that contacts the magnetic particles can be increased and also the reactivity can be improved.

As the microchannel, the publicly known microchannel can be used. As the material of the microchannel constituent members constituting the microchannel, various ceramics such as glass, silicon, etc., polymer resin, and others can be listed. In order to control the magnetic particles by using the magnet from the outside of the microchannel, preferably the material of the microchannel constituent member should not have a magnetism.

The microchannel has at least one intake port for introducing the fluid, and at least one exhaust port for exhausting the fluid. Also, plural intake ports and/or exhaust ports can be provided to the microchannel.

(Microreactor Device)

The microreactor device of the present invention is the device that has at least one microchannel (channel). It is preferable that plural microchannels should be provided to the microreactor device A supply pump, a micro syringe, or the like for feeding the fluid may be provided to the microreactor device. Also, a sensing device may be provided. Also, a temperature controlling means may be provided, as occasion demands.

(Cleaning Method)

The microchannel cleaning method of the present invention includes a step of introducing the magnetic particles in the microchannel, a step of bringing the magnetic particles into contact with the inner wall of the microchannel by exerting a magnetic force from the outside of the microchannel, and a step of setting up a relative motion while keeping a contact state of the magnetic particles to the inner wall of the microchannel.

The magnetic particles can be brought into contact with the inner wall of the microchannel by the electromagnet. As a result, the cleaning of the inner wall of the microchannel is carried out.

According to this method, the cleaning can be carried out by feeding the magnetic particles together with the fluid.

Also, the inside of the microchannel can be cleaned not to need an overhaul, etc. of the microreactor device.

The cleaning method of the present invention can be used in the publicly known microreactor device. The device to which the cleaning method is applied is not particularly limited if such device can move the magnetic particles by a magnetic force applied from the outside of the microchannel.

For the purpose of cleaning, preferably a mechanical detergency and/or a chemical detergency of the magnetic particles should be improved. Concretely, the surface roughening process can be applied to enhance a mechanical detergency of the surface of the magnetic particle, otherwise the surface can be processed with the functional groups having a surface activating effect to enhance a chemical detergency. Preferably the process should be selected appropriately in answer to the purpose. Also, preferably various surfactants, abrasives such as the inorganic fine grains, or the like should be added in combination with the magnetic particles.

It is preferable that the external magnet should be moved to clean the inner wall of the microchannel. Preferably, the magnetic particles in the microchannel should be caught by the external magnet to move the magnetic material containing composition toward the inner wall of the microchannel, and then the inner wall of the microchannel should be cleaned effectively by moving the magnet along the microchannel.

Also, the inside of the microchannel can be cleaned effectively by reciprocally moving the magnet plural times.

EXAMPLES

Example 1

(Manufacture of Magnetic Particles)

A surface of the magnetite particle (volumetric average particle diameter 10 µm) was processed by γ-aminopropyl triethoxysilane, and the amino group was introduced into the surface of the particle. Then, the particles were dispersed into the water, and then the amylase (enzyme) was fixed by using carbodiimide as the reactant. Thus, a magnetic particle dispersed solution bearing the enzyme could be obtained.

A concentration of the magnetic particles in the magnetic particle dispersed solution was adjusted to 5 wt %.

As the microchannel, the channel formed in a glass substrate with a length of 20 cm to have a width of 1 mm (sectional shape is a square with one side 1 mm in length) was used. When the ferrite magnet with a width of 5 cm was arranged on the outside in the center portion of this channel and then the magnetic particle dispersed solution was fed from one side of the channel, the particles were positioned and fixed under the magnet. The magnetic particles were arranged in 5 cm width in the channel to such extent that these particles buried the inside of the channel apparently substantially completely.

Then, a temperature of the device was adjusted to 35° C., then a 5 wt % starch solution was fed into the channel at a flow rate of 10 cm/min, and then the solution was sampled and analyzed on the outlet side. As a result, it was found that the starch was decomposed into glucoses at a reaction rate of almost 80 %. A satisfactory catalytic action was confirmed from this result. Also, when the magnet was removed after the reaction while the fluid was being supplied, the magnetic particles flowed out of the channel and thus the magnetic particles could be recovered. In addition, the microchannel could also be reused.

Example 2

The microchannel similar to that in Example 1 was used as the microchannel, and the particles on which the chymase was borne were fixed in the channel by the method similar to that in Example 1.

Then, a temperature of the device was adjusted to 35° C., then a 5 wt % glucose solution was fed into the channel at a flow rate of 10 cm/min, and then the solution was sampled and analyzed on the outlet side. As a result, it was found that the glucose was inverted into ethanol at a reaction rate of almost 80%. A satisfactory catalytic action was confirmed from this result.

Also, when the magnet was removed after the reaction while the fluid was being supplied, the magnetic particles flowed out of the channel and thus the magnetic particles could be recovered. In addition, the microchannel could also be reused.

Example 3

The microchannel similar to that in Example 1 was used as the microchannel, and then two type particles of the amylase-fixed particles used in Example 1 and the chymase-fixed particles manufactured in Example 2 were arranged in different portions by following approaches respectively. Similarly the chymase particles used in Example 2 were arranged in a ⅓ position of the full length from the microchannel outlet (exhaust port) by using the same magnet as in Example 1. Then, the amylase particles used in Example 1 were arranged in a ⅓ position of the full length from the microchannel inlet (intake port) by using another magnet.

Then, a temperature of the device was adjusted to 35° C., then a 5 wt % starch solution was fed into the channel at a flow rate of 10 cm/min, and then the solution was sampled and analyzed on the outlet (exhaust port) side. As a result, it was found that the ethanol was generated at a reaction rate of almost 80%. It was confirmed from this result that the reaction could be produced successively by arranging two different types of enzymes in different portions in the microchannel. Also, when the magnet was removed after the reaction while the fluid was being supplied, the magnetic particles flowed out of the channel and thus respective magnetic particles could be recovered individually. In addition, the microchannel could also be reused.

Example 4

A solution in which 50 µm magnetite particles were dispersed into the water was prepared. Then, this solution was introduced into the 1 mm diameter channel whose inner wall was contaminated by the reaction, and the magnetic particles were caught by the magnet from the outside. Then, when the magnetic particles were moved many times in the microchannel to make a reciprocating motion, the inner wall of the microchannel could be cleaned.

Example 5

(Manufacture of Polymer Gel Particles)

An aqueous solution in which acrylamide 10 g, methylenebisacrylamide 0.1 g as the crosslinking agent, and magnetite particles (volumetric average particle diameter about 5 μm) 5 g were dispersed into a distilled water 20 g was prepared. Then, ammonium peroxodisulfate 0.1 g was added to this solution as the polymerization initiator, then this solution was merged with a cyclohexane solution (containing sorbitan ester as the surfactant) 100 ml, then a resultant solution was stirred with a stirrer, and then the suspension polymerization was produced by heating the solution up to 60° C. After the polymerization was finished, the gel particles containing the generated magnetic material were separated by the sedimentation method, and then the magnetic particles were purified by rinsing the gel particles with the water. The resultant magnetic particle was like an almost true sphere, and a volumetric average particle diameter in a pure water was 50 μm.

As the microchannel, the channel formed in a glass substrate with a length of 20 cm to have a width of 1 mm (sectional shape is a square with one side 1 mm in length) and having a Y-branch in its inside was used. When the polymer gel particles were arranged in one of the Y-branch channels by the magnet, one of the channels was blocked and the fed aqueous solution flowed out only of one outlet. When the magnet was removed, the magnetic particles flowed out of both channels. As a result, it was confirmed that a flow of the fluid through the microchannel could be controlled by using the magnetic particles and the magnet.

What is claimed is:

1. A microreactor device comprising:
   a microchannel;
   magnetic particles that are introduced into the microchannel; and
   a magnet that is arranged on an outside of the microchannel and exerts a magnetic force on the magnetic particles, wherein the magnetic particles include a catalyst for facilitating a reaction.

2. A microreactor device as claimed in claim 1, wherein the magnetic particles are at least one of a magnetic material and a composition containing the magnetic material.

3. A microreactor device as claimed in claim 2, wherein the magnetic particles comprise a magnetic material selected from the group consisting of magnetite, ferrite, iron, iron oxide, cobalt-iron oxide, samarium-cobalt magnet and neodymium iron boron.

4. A microreactor device as claimed in claim 2, wherein the magnetic particles comprise a magnetic material selected from the group consisting of:
polymer particles, polymer gel particles and inorganic particles containing magnetite, ferrite, iron, iron oxide, cobalt-iron oxide, samarium-cobalt magnet and neodymium iron boron; and a mixture of at least one of the polymer particles, the polymer gel particles and the inorganic particles.

5. A microreactor device as claimed in claim 4, wherein the inorganic particles comprise glass.

6. A microreactor device as claimed in claim 1, wherein the magnetic particles have one of an elliptic shape and a spherical shape.

7. A microreactor device as claimed in claim 1, wherein the magnetic particles have reactive functional groups.

8. A microreactor device as claimed in claim 1, wherein the catalyst comprises:
   a material selected from titanium, zirconium, chromium, molybdenum, iron, ruthenium, cobalt, rhodium, nickel, palladium, platinum and zeolite; and
   organic metal catalysts containing the material as a component.

9. A microreactor device as claimed in claim 1, wherein the catalyst is selected from the group consisting of amylase, protease, lipase, celllase, hemicellulase, pectinase, glucose oxidase and chymase.

10. A microreactor device as claimed in claim 7, wherein the reactive functional groups are selected from the group consisting of a hydrogen bond, a covalent bond and an ionic bond.

11. A microreactor device as claimed in claim 7, wherein the reactive functional groups are selected from the group consisting of antigen and antibody, and deoxyribonucleic acid and ribonucleic acid.

12. A microreactor device as claimed in claim 1, wherein the magnetic particles are provided at a predetermined position in the microchannel by the magnet.

13. A microreactor device as claimed in claim 1, wherein the magnetic particles are provided at a plurality of predetermined positions in the microchannel by the magnet.

14. A microreactor device as claimed in claim 1, wherein the magnetic particles are ejected from an inside of the microchannel by the magnet.

15. A microchannel cleaning method comprising:
   introducing magnetic particles into a microchannel;
   bringing the magnetic particles into contact with an inner wall of the microchannel by exerting a magnetic force from an outside of the microchannel; and
   reciprocating the magnetic particles along the inner wall of the microchannel while keeping a contact state of the magnetic particles to the inner wall of the microchannel, wherein the magnetic particles include a catalyst for facilitating a reaction.

16. A microchannel cleaning method as claimed in claim 15, wherein the magnetic particles have a surface applied surface roughening process.

17. A microchannel cleaning method as claimed in claim 15, wherein the magnetic particles have a surface processed with functional groups having a surface activating effect.

18. A microchannel cleaning method as claimed in claim 15, wherein the reciprocating of the magnetic particles comprise adding a surfactant to an inside of the microchannel.

19. A microchannel cleaning method as claimed in claim 15, wherein the reciprocating of the magnetic particles comprise adding an abrasive to an inside of the microchannel.

20. A microchannel cleaning method as claimed in claim 19, wherein the abrasive comprises inorganic fine grains.

* * * * *